(12) United States Patent
Kikuchi et al.

(10) Patent No.: US 10,613,326 B2
(45) Date of Patent: Apr. 7, 2020

(54) HEADS-UP DISPLAY DEVICE

(71) Applicant: NIPPON SEIKI CO., LTD., Niigata (JP)

(72) Inventors: Yuta Kikuchi, Niigata (JP); Yuichi Takahashi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/336,431

(22) PCT Filed: Sep. 12, 2017

(86) PCT No.: PCT/JP2017/032810
§ 371 (c)(1),
(2) Date: Mar. 25, 2019

(87) PCT Pub. No.: WO2018/061745
PCT Pub. Date: Apr. 5, 2018

(65) Prior Publication Data
US 2019/0212554 A1    Jul. 11, 2019

(30) Foreign Application Priority Data

Sep. 30, 2016   (JP) ................................ 2016-192846

(51) Int. Cl.
*G06F 3/01*         (2006.01)
*G02B 27/01*    (2006.01)
(Continued)

(52) U.S. Cl.
CPC .......... *G02B 27/0101* (2013.01); *B60K 35/00* (2013.01); *G02B 5/08* (2013.01);
(Continued)

(58) Field of Classification Search
CPC ...... G06K 9/00597–00617; A61B 3/00; G06F 3/011; G06F 3/012
See application file for complete search history.

(56) References Cited

U.S. PATENT DOCUMENTS

2006/0007170 A1*   1/2006   Wilson .................. G06F 3/0425
                                                          345/173
2010/0033791 A1*   2/2010   Nakanishi ............ G02B 26/101
                                                          359/204.2
(Continued)

FOREIGN PATENT DOCUMENTS

JP    2015-082019 A    4/2015
JP    2015-197496 A    11/2015
JP    2016-103008 A    6/2016

OTHER PUBLICATIONS

International Search Report issued in corresponding International Patent Application No. PCT/JP2017/032810, dated Dec. 5, 2017, with Engish Translation.

*Primary Examiner* — Sanghyuk Park
(74) *Attorney, Agent, or Firm* — McDermott Will & Emery LLP

(57) ABSTRACT

The present invention implements a more compact head-up display device and improves mountability on a vehicle. A first mirror causes first display light generating an upper end of a virtual image display plane to intersect with second display light generating a lower end of the virtual image display plane between the first mirror and a second mirror. The first mirror is formed such that the width of a first reflection area for reflecting the first display light is shorter than the width of a second reflection area for reflecting the second display light. The second mirror is formed such that the width of a third reflection area for reflecting the first display light is shorter than the width of a fourth reflection area for reflecting the second display light.

7 Claims, 2 Drawing Sheets

(51) Int. Cl.
*B60K 35/00* (2006.01)
*G02B 5/08* (2006.01)

(52) U.S. Cl.
CPC ......... *G02B 27/01* (2013.01); *G02B 27/0149* (2013.01); *B60K 2370/155* (2019.05); *B60K 2370/1529* (2019.05); *B60K 2370/23* (2019.05)

(56) References Cited

U.S. PATENT DOCUMENTS

2010/0103077 A1* 4/2010 Sugiyama ............ G02B 27/017 345/8
2017/0315351 A1 11/2017 Yamazoe et al.

* cited by examiner

HEADS-UP DISPLAY DEVICE

CROSS REFERENCE

This application is the U.S. National Phase under 35 U.S.C. § 371 of International Application No. PCT/JP2017/032810, filed on Sep. 12, 2017, which claims the benefit of Japanese Application No. 2016-192846, filed on Sep. 30, 2016, the entire contents of each are hereby incorporated by reference.

TECHNICAL FIELD

The present invention relates to a head-up display device which displays a virtual image.

BACKGROUND ART

The head-up display device is mounted on, for example, a vehicle, and superimposes and displays various kinds of information on a scenery (foreground) ahead of a line of sight of a driver). The driver can visually recognize information necessary for driving while keeping the line of sight on a road surface or an object in a front direction. Such an on-vehicle head-up display device is known from Patent Literature 1.

A head-up display device known in Patent Literature 1 includes a display device that emits display light upward, a first mirror that reflects the display light emitted from the display device in a horizontal direction, and a second mirror that further reflects the display light reflected by the first mirror toward a windshield. The display is arranged under the second mirror. A driver can see the display light (displayed image) reflected on the windshield and recognize it as a scenery ahead of the vehicle, that is a virtual image that can be seen with the foreground.

In the head-up display device known in the Patent Literature 1, the display device and the first mirror become large-sized, and an optical path to be emitted from the first mirror to the second mirror becomes large, and the second mirror becomes large accordingly.

In addition, in a dashboard where the head-up display device is disposed, various other parts such as a duct and a harness are arranged, so the dashboard is fairly narrow. In order to arrange the head-up display device in such a narrow arrangement space without interfering with other parts, it is necessary to further downsize this head-up display device.

CITATION LIST

Patent Literature

Patent Literature 1: Japanese Patent Application No. 2016-103008

SUMMARY OF THE INVENTION

Problems to be Solved by the Invention

A problem of the present invention is to provide a technique capable of achieving downsizing of a head-up display device and enhancing mountability of same to a vehicle.

Solution to Problem

A first aspect of the present invention relates to a head-up display device comprising: a first mirror (20) configured to reflect a display plane (12) of a display (10) capable of displaying a display image (M); and a second mirror (30) configured to reflect the display plane reflected by the first mirror on a display member (2), thereby creating a hypothetical virtual image display plane (200) capable of displaying a virtual image (V) corresponding to the display image, wherein the first mirror crosses, between the first mirror and the second mirror, first display light (101) from a first display area (13) of the display plane to the virtual image display plane, the first display light (101) being configured to generate an upper end (201) of the virtual image display plane and second display light (102) from a second display area (14) of the display plane to the virtual image display plane, the second display light (102) being configured to generate a lower end (202) of the virtual image display plane, thereby making a width of a reflection area (21) reflecting the first display light shorter than a width of a reflection area (22) reflecting the second display light, and wherein the second mirror is configured in such a manner that a width of a reflection area (31) reflecting the first display light is made shorter than a width of a reflection area (32) reflecting the second display light.

Effect Of The Invention

According to the present invention, downsizing of a head-up display device can be achieved, and mountability of same to a vehicle can be improved.

MODE FOR CARRYING OUT THE INVENTION

Figure 1:
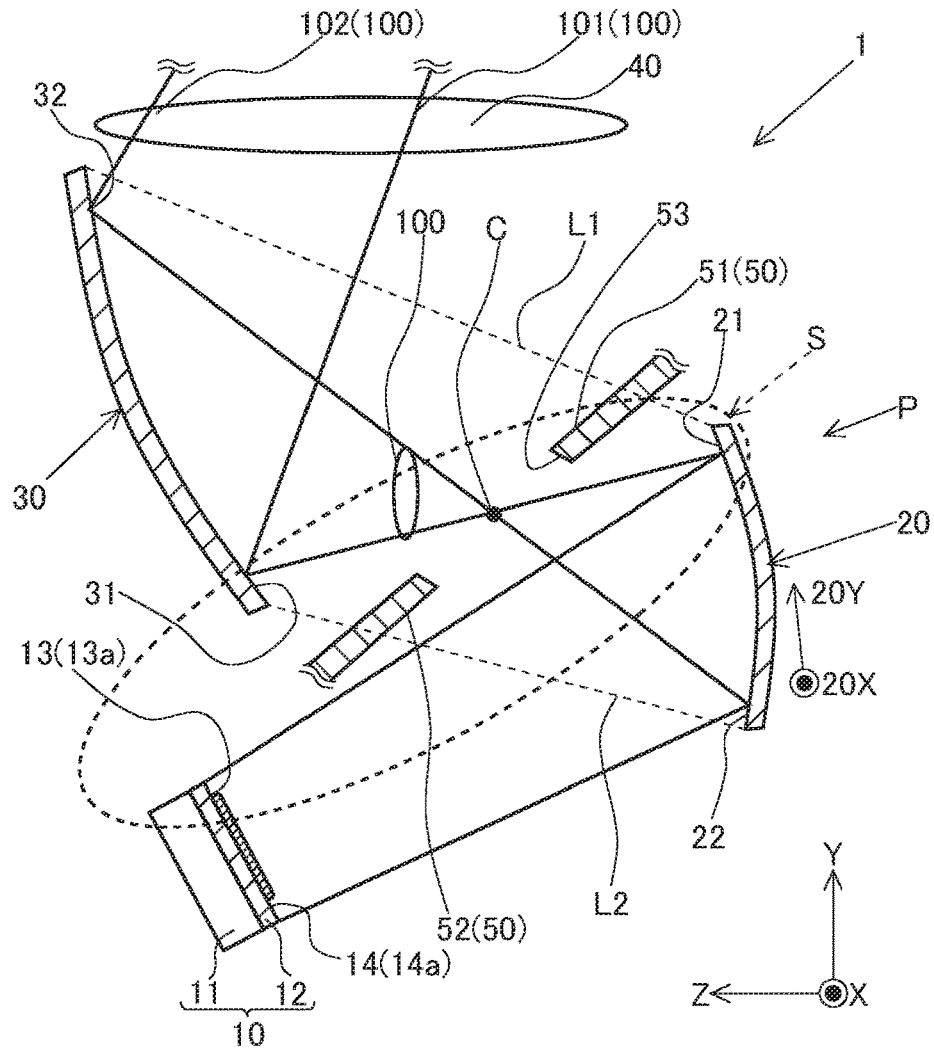
FIG. 1 is a diagram illustrating a configuration of a head-up display device according to an embodiment of the present invention.
Figure 2:
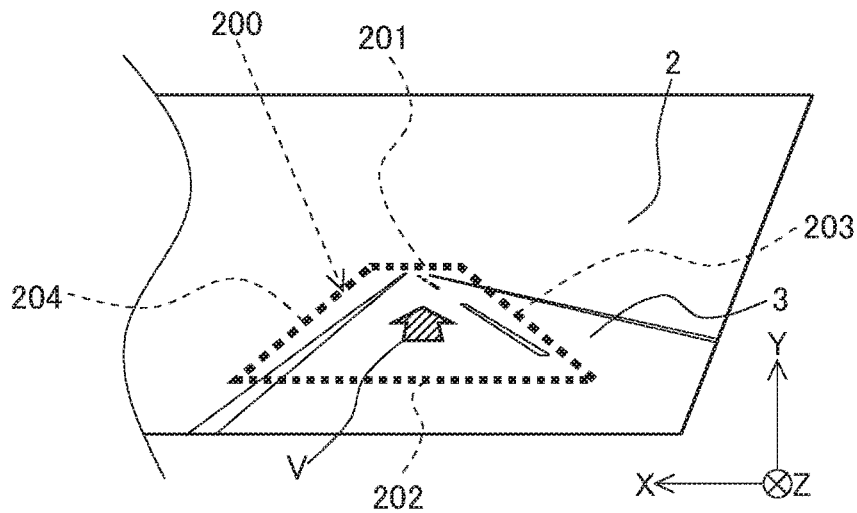
FIG. 2 is a diagram showing an example of a virtual image display plane generated by the head-up display device according to the above embodiment.

Hereinafter, a head-up display device according to this embodiment will be described with reference to the drawings. A head-up display device 1 (hereinafter referred to as "HUD device") is provided in, for example, a dashboard of a vehicle, and includes: a display device 10 including a display plane 12 capable of displaying a display image M; and a relay optical system including a first mirror 20 and a second mirror 30 which will be described later. The HUD device 1 reflects the display plane 12 of the display device 10 on a windshield 2 (one example of a display member) located forward of a viewer (mainly driver) via the relay optical system, thereby generating a virtual image display plane 200 corresponding to the display plane 12. The HUD device 1 displays the display image M on the display plane 12, thereby displaying on the virtual image display plane 200 a virtual image V based on the display image M.

FIG. 1 is a diagram showing a configuration of the HUD device 1, in which when the viewer faces forward, a left-right direction is defined as an X-axis, a right direction is defined as an X-axis positive direction, an up-and-down direction is defined as an Y-axis, an upper direction is defined as an Y-axis positive direction, a front-rear direction is defined as a Z-axis, and a front direction is defined as a Z-axis positive direction. FIG. 1 shows only first display light 101 emitted from the first display area 13 on the display plane 12 corresponding to the upper end 201 of the virtual image display plane 200 to the viewer and second display light 102 emitted from the second display area 14 on the display plane 12 corresponding to the lower end 202 of the virtual image display plane 200 to the viewer, and other display light 100 is omitted. As shown in FIG. 1, the HUD device 1 includes: a display 10 that displays the display image M, a first mirror 20 and a second mirror 30, which are a relay optical system that directs the display light 100 of the display image M displayed by the display 10 to an eye box; a housing (not shown) that houses the display 10 and these first mirror 20 and second mirror 30; and a control unit (not shown) that performs electrical control of the HUD device 1.

The housing is formed in a box shape from a hard resin material or the like. An opening (not shown) is formed in a portion of a peripheral wall of the housing facing the windshield 2. The opening is closed by a light-transmitting part 40 formed of a transparent resin material or the like. The display light 100 passes through the light-transmitting part 40 to travel to the windshield 2 from an inside of the housing. Each component of the HUD device 1 excluding the control unit is embedded in the housing. The control unit may be provided in the housing.

The display device 10 displays the display image M generated by the image generation unit 11 on the display plane 12. The image generation unit 11 is, for example, a transmission type display device comprised of an LCD, a self-luminous display device such as an organic EL, a reflective display device using a DMD or an LCoS (registered trademark) or the like, and a laser beam scanning type display device that scans a laser beam, or the like. When the image generation unit 11 is the transmission type display device or the self-luminous display device, the display plane 12 refers to a surface of the display device, and when the image generation unit 11 is the reflective display device or the laser beam scanning type display device, the display plane 12 refers to a screen on which light from the image generation unit 11 is projected.

The display 10 displays the display image M on the display plane 12, thereby emitting the display light 100 based on the display image M toward the first mirror 20 disposed above the display 10 (Y-axis positive direction). The display 10 emits from the first display area 13 on the display plane 12 corresponding to the upper end 201 of the virtual image display plane 200 to a first reflection area 21 of the first mirror 20, and emits from the second display area 14 on the display plane 12 corresponding to the lower end 202 of the virtual image display plane 200 to a second reflection area 22 of the first mirror 20. The display plane 12 of the display 10 is formed in such a manner that a width of the first display area 13 of the display plane 12 (length in the X-axis direction), that corresponds to a length in the left-right direction of the upper end 201 of the virtual image display plane 200 becomes shorter than a width of the second display area 14 of the display plane 12 (length in the X-axis direction), that corresponds to a length in the left-right direction of the lower end 202 of the virtual image display plane 200. The display plane 12 is disposed in such a manner that the first display area 13 is disposed so as to be closer to the second mirror 30 that will be described later than the second display area 14.

Here, a contour of the display plane 12 is described. Generally, a surface of the windshield 2 has a curved surface shape. In addition, the display light 100 emitted from the display plane 12 is reflected on the surface of the windshield 2 after being reflected several times by a plurality of mirrors (the first mirror 20 and the second mirror 30). For this reason, the virtual image V that is visually recognized by the viewer is normally distorted. On the other hand, the HUD device 1 of the present invention preliminarily corrects the display light 100 emitted from the display plane 12 by the display 10, thereby canceling the distortion of the virtual image V visually recognized by the viewer. Taking this into consideration, the contour of the display plane 12 of the present invention includes not only a complete trapezoid but also a trapezoid approximated to an extent that the display light 100 is preliminarily corrected.

The contour (peripheral edge) of the display plane 12 is substantially (basically) a trapezoid, and a short side 13a on the first display area 13 side corresponding to the upper end 201 of the virtual image display plane 200 and a long side 14a on the second display area 14 side, that is opposite to this short side and corresponds to the lower end 202 of the virtual image display plane 200, extend parallel to each other in the width direction (X-axis direction). Of this one pair of opposite sides, the short side 13a on a side of the first display area 13 is arranged closer to the third reflection area 31 of the second mirror 30 than the long side 14a on a side of the second display area 14. For example, a shape of the trapezoid may be a bilaterally symmetrical shape in which the long side 13a (a lower base 13a of the trapezoid) and the short side 14a (an upper base 14a of the trapezoid) are horizontal.

The first mirror 20 is a free curved surface mirror having different optical powers in a first direction 20X and in a second direction 20Y that are orthogonal in a reflective surface, and has a curvature such that the display light 100 emitted from the display 10 is reflected toward the second mirror 30 and the reflected display light 100 is crossed up and down before reaching the first mirror 20. Specifically, the first mirror 20 has a positive optical power in the first direction 20X such that a plurality of display lights 100 (for example, first display light 101, second display light 102) which generate respective regions aligned in the up-and-down direction of the virtual image display plane 200 (for example, upper end 201, lower end 202) are converged so as to have a cross point C between the first mirror 20 and the second mirror 30. In addition, the optical power in the second direction 20Y orthogonal to the first direction 20X of the first mirror 20 is smaller than that in the first direction 20X, and the plurality of display lights 100 which generate the respective regions aligned in the left-right direction of the virtual image display plane 200 (for example, a right end 203, a left end 204) do not cross between the first mirror 20 and the second mirror 30. The first mirror 20 is formed in such a manner that a width (length in the X-axis direction) of the first reflection area 21 which reflects the first display light 101 that generates the upper end 201 of the virtual image display plane 200 becomes shorter than a width (length in the X-axis direction) of the second reflection area 22 which reflects the second display light 102 that generates the lower end 202 of the virtual image display plane 200, and the first reflection area 21 is arranged so as to be closer, to the light-transmitting part 40 from which the display light 100 is emitted to the outside of the HUD device 1, than the second display area 14.

The second mirror 30 is a concave free curved surface mirror having a function to expand the display image M displayed mainly on the display device 10 to reflect same on the windshield 2, and reflects the display light 100 reflected by the first mirror 20 toward the windshield 2. The second mirror 30 may have a function to adjust an imaging distance of the virtual image V and a function to suppress distortion of the virtual image V. The second mirror 30 is formed in such a manner that a width of the third reflection area 31 which reflects the first display light 101 that generates the upper end 201 of the virtual image display plane 200 becomes shorter than a width of the fourth reflection area 32 which reflects the second display light 102 that generates the lower end 202 of the virtual image display plane 200, and the third reflection area 31 is arranged so as to be closer, to the light-transmitting part 40 from which the display light 100 is emitted to the outside of the HUD device 1, than the fourth reflection area 32.

The light-shielding part 50 includes a first light-shielding part 51 and a second light-shielding part 52 that extend to a vicinity of the cross point C so as to sandwich the display light 100 between the first mirror 20 and the second mirror 30. The first light-shielding part 51 and the second light-shielding part 52 form a display opening 53 which is an opening through which the display light 100 passes. The light-shielding part 50 can block, by the first light-shielding part 51 and the second light-shielding part 52, external light entering the housing from the outside of the HUD device 1 and being reflected by the second mirror 30 toward the first mirror 20. The light-shielding part 50 may be integrally formed in the housing or may be formed separately. Since the light-shielding part 50 reaches a high temperature due to the external light, it is desirable that the light-shielding part 50 is formed of a member having a high thermal conductivity such as a metal such as aluminum or a resin containing a metal filler or the like.

A lower end (tip end) of the first light-shielding part 51 is at least located closer to a cross point C side (lower side) than a line segment L1 connecting an upper end portion of the first reflection area 21 that reflects the first display light 101 in the first mirror 20 and an upper end portion of the fourth reflection area 32 that reflects the second display light 102 of the second mirror 30.

An upper end (tip end) of the second light-shielding part 52 is at least located closer to a cross point C side (upper side) than a line segment L2 connecting, a lower end portion of the second reflection area 22 that reflects the second display light 102 in the first mirror 20 and a lower end portion of the third reflection area 31 that reflects the first display light 101 in the second mirror 30.

The first light-shielding part 51 and the second light-shielding part 52 extend in such a manner that tips thereof approach each other. As the tips approach closer to each other, the light-shielding property against external light becomes higher, which is desirable. That is, it is desirable that the tips of each other are close to the cross point C and the display opening 53 is made small.

As described above, in the HUD device 1 according to this embodiment, the first mirror 20 crosses, between the first mirror 20 and the second mirror 30, the first display light 101 from the first display area 13 of the display plane 12 to the virtual image display plane 200, that generates the upper end 201 of the virtual image display plane 200 and the second display light 102 from the second display area 14 of the display plane 12 to the virtual image display plane 200, that generates the lower end 202 of the virtual image display plane 200, thereby turning upside down the display image M reflected on the first mirror 20 and the display image M reflected on the second mirror 30. In addition, the first mirror 20 is formed in such a manner that a width of the first reflection area 21 that reflects the first display light 101 is shorter than a width of the second reflection area 22 that reflects the second display light 102, and the second mirror 30 is formed in such a manner that the width of the third reflection area 31 that reflects the first display light 101 is shorter than the width of the fourth reflection area 32 that reflects the second display light 102. With this, in an area S (see FIG. 1) surrounding the first display area 13 having a short width in the display plane 12, the first reflection area 21 having a short width in the first mirror 20, and the third reflection area 31 having a short width in the second mirror 30, a width of the housing of the HUD device 1 can be reduced. In addition, a size of the display opening 53 formed by the light-shielding part 50 can be suppressed small, and the light-shielding property against external light can be further enhanced.

Figure 3:
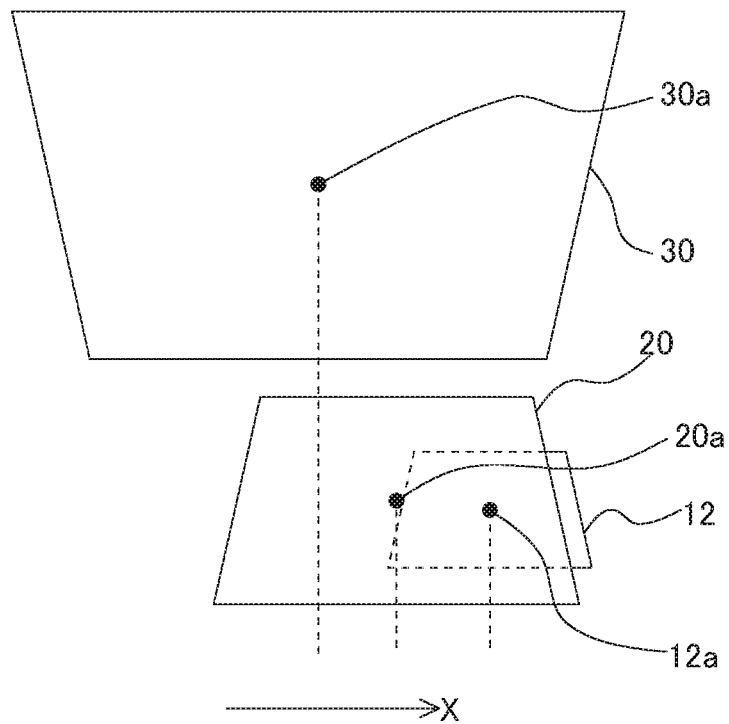
FIG. 3 is a diagram showing an example of an arrangement of the display plane, a first mirror, and a second mirror of the head-up display device in the above embodiment, as viewed from a point P in FIG. 1.

FIG. 3 is a diagram showing an example of an arrangement of the display plane 12, the first mirror 20, and the second mirror 30 of the head-up display device 1 in this embodiment, as viewed from a point P in FIG. 1. The respective centers of the display plane 12, the first mirror 20, and the second mirror 30 are denoted as 12a, 20a, and 30a. The first mirror 20 and the display plane 12 may be arranged eccentrically in the width direction (X-axis direction) with respect to the second mirror 30. In addition, the first mirror 20 may be disposed eccentrically in the width direction with respect to the second mirror 30, and the display 10 may further be disposed in such a manner that the display plane 12 is decentered in the width direction with respect to the first mirror 20. By these, it is possible to create a large space in the width direction (X-axis direction) of the first mirror 20 and the display plane 12 of the HUD device 1, and the housing of the HUD device 1 can be made smaller or other components of the HUD device 1 can be disposed in an empty space.

As described above, the embodiment has been described as an example of the technique disclosed in the present application. However, the technique in the present disclosure is not limited to this, and can also be applied to an embodiment in which modifications, substitutions, additions, omissions, and the like are made without departing from the gist of the present invention. In addition, it is also possible to combine each component disclosed in the present application to form a new embodiment.

INDUSTRIAL APPLICABILITY

The present invention is applicable as a display device that allows visual recognition of a virtual image, such as a head-up display device and the like mounted on a vehicle.

DESCRIPTION OF REFERENCE NUMERALS

1 . . . HUD device (head-up display device), 2 . . . windshield (display member), 3 . . . foreground, 10 . . . display, 11 . . . image generation unit, 12 . . . display plane, 13 . . . first display area, 14 . . . second display area, 20 . . . first mirror, 21 . . . first reflection area, 22 . . . second reflection area, 30 . . . second mirror, 31 . . . third reflection area, 32 . . . fourth reflection area, 40 . . . light-transmitting part, 50 . . . light-shielding part, 100 . . . display light, 1001 . . . first display light, 102 . . . second display light, 200 . . . virtual image display plane, 201 . . . upper end, 202 . . . lower end, C . . . cross point, M . . . display image, V . . . virtual image

The invention claimed is:

1. A head-up display device comprising:

a first mirror configured to reflect a display plane of a display capable of displaying a display image; and a second mirror configured to reflect the display plane reflected by the first mirror on a display member, thereby creating a hypothetical virtual image display plane capable of displaying a virtual image corresponding to the display image, wherein the first mirror crosses, between the first mirror and the second mirror, first display light from a first display area of the display plane to the virtual image display plane, the first display light being configured to generate an upper end of the virtual image display plane and second display light from a second display area of the display plane to the virtual image display plane, the second display light being configured to generate a lower end of the virtual image display plane, thereby making a width of a reflection area reflecting the first display light shorter than a width of a reflection area reflecting the second display light, and wherein the second mirror is configured in such a manner that a width of a reflection area reflecting the first display light is made shorter than a width of a reflection area reflecting the second display light.

2. The head-up display device according to claim 1, wherein the display is configured in such a manner that a width of the first display area is made shorter than a width of the second display area.

3. The head-up display device according to claim 1, wherein the first mirror and the display plane of the display are decentered in a width direction with respect to the second mirror.

4. The head-up display device according to claim 1, wherein the first mirror is eccentrically arranged in the width direction with respect to the second mirror, and the display is arranged in such a manner that the display plane is decentered in the width direction with respect to the first mirror.

5. The head-up display device according to claim 1, wherein a width of the upper end is shorter than a width of the lower end in the virtual image display plane.

6. The head-up display device according to claim 2, wherein the first mirror and the display plane of the display are decentered in a width direction with respect to the second mirror.

7. The head-up display device according to claim 2, wherein the first mirror is eccentrically arranged in the width direction with respect to the second mirror, and the display is arranged in such a manner that the display plane is decentered in the width direction with respect to the first mirror.

* * * * *

UNITED STATES PATENT AND TRADEMARK OFFICE
CERTIFICATE OF CORRECTION

Page 1 of 1

PATENT NO. : 10,613,326 B2
APPLICATION NO. : 16/336431
DATED : April 7, 2020
INVENTOR(S) : Yuta Kikuchi et al.

It is certified that error appears in the above-identified patent and that said Letters Patent is hereby corrected as shown below:

On the Title Page

Item (54) and in the Specification, Column 1, Line 1 should read:
HEAD-UP DISPLAY DEVICE Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*